United States Patent [19]

Evans et al.

[11] Patent Number: 5,448,619
[45] Date of Patent: Sep. 5, 1995

[54] APPARATUS AND A METHOD OF ALLOWING PRIVATE CELLULAR OPERATION WITHIN AN EXISTING PUBLIC CELLULAR SYSTEM

[75] Inventors: Michael W. Evans; Samuel A. Leslie, both of Forest, Va.

[73] Assignee: Orion Industries, Inc., Solon, Ohio

[21] Appl. No.: 868,472

[22] Filed: Apr. 14, 1992

[51] Int. Cl.⁶ .................... H04M 11/00; H04Q 7/00; H04B 1/00
[52] U.S. Cl. ........................................ 379/58; 379/59; 379/60; 455/33.1; 455/33.2; 455/54.1
[58] Field of Search ........................... 379/58, 59, 60; 455/33.1, 33.2, 54.1

[56] References Cited

U.S. PATENT DOCUMENTS

| | | | |
|---|---|---|---|
| 3,906,166 | 9/1975 | Cooper et al. | 379/59 |
| 4,771,448 | 9/1988 | Koohgoli et al. | 379/60 |
| 4,775,998 | 10/1988 | Felix et al. | 379/59 |
| 4,790,000 | 12/1988 | Kinoshita | 379/61 |
| 4,799,253 | 1/1989 | Stern et al. | 379/59 |
| 4,881,271 | 11/1989 | Yamauchi et al. | 379/58 |
| 4,953,198 | 8/1990 | Daly et al. | 379/63 |
| 5,020,092 | 5/1991 | Phillips et al. | 379/59 |
| 5,067,147 | 11/1991 | Lee | 379/59 |
| 5,127,042 | 6/1992 | Gillig et al. | 379/59 |
| 5,148,548 | 9/1992 | Meche et al. | 379/59 |
| 5,179,720 | 1/1993 | Crube et al. | 455/33.4 |
| 5,247,701 | 9/1993 | Comroe | 379/60 |
| 5,353,332 | 10/1994 | Raith et al. | 379/59 |
| 5,355,367 | 10/1994 | Comroe et al. | 455/33.1 |

OTHER PUBLICATIONS

EIA/TIA-PN2759 document entitled "Cellular System Dual-Mode Mobile Station-Base Station Compatibility Standard", Unofficial Letter-Ballot Version, Aug. 1991, pp. 1-272.
Southwestern Bell, Matsushita/Panasonic Personal Communication System, Dec. 27, 1991, two pages.

Primary Examiner—Stephen Chin
Assistant Examiner—Vijay Shankar
Attorney, Agent, or Firm—Dressler, Goldsmith, Shore & Milnamow, Ltd.

[57] ABSTRACT

An apparatus and method which can provide a private cellular system within an area already served by a public cellular system include a receiver for receiving RF control signals from the public system. The public system control signals are converted to saturation level control signals from the private system. Subscriber units to be serviced by the public system are directed thereto. Those associated with the private system can be serviced directly.

8 Claims, 5 Drawing Sheets

APPARATUS AND A METHOD OF ALLOWING PRIVATE CELLULAR OPERATION WITHIN AN EXISTING PUBLIC CELLULAR SYSTEM

FIELD OF THE INVENTION

The invention pertains to radio telephone systems. More particularly, the invention pertains to cellular radio telephone systems where a publicly available cellular system has a coverage area which overlaps a coverage area of a limited access, or private system.

BACKGROUND OF THE INVENTION

Public access cellular systems are currently available for use in major markets in the U.S., Canada, and numerous foreign countries. The ability to communicate with a land line telephone system from a portable or mobile cellular unit has become a valuable business asset.

As a result of experiences with public cellular systems, corporate interest has emerged in being able to combine radiotelephony with private land line corporate telephone systems. Such systems, so called "private cellular systems" need to be able to provide service in a coverage area to only authorized users. In many instances, the coverage region of private cellular system must simultaneously coexist with any overlapping region of a public system and not interfere therewith.

This problem is exacerbated by the fact that it is more cost effective to use the same subscriber or user equipment in both systems than to have special transceivers for the private system. Using the same subscriber equipment for both the public and the private system introduces potential frequency allocation conflicts.

When it is necessary to service movable units in a private system that is in the coverage area of a public cellular carrier, there are two conflicting problems. If the RF coverage area of the private system is limited or spotty, it is possible for the subscriber units or mobiles that are supposed to lock onto the private system to instead lock onto service in the surrounding public system.

If, however, the private system saturates the area with RF (to ensure capture of the subscriber units), its coverage area will expand, and as a result, the private system will capture subscriber units that should be locked to the public system.

This results from the operation of subscriber or movable cellular units which will always scan for and lock onto the strongest control channel. If a subscriber unit is locked onto the wrong system, it will not be possible for it to make or receive calls on the desired system.

Previously, special programming of the subscriber units and the private system was required to attempt to control access to the private or limited access system. In these prior attempts, either non-standard control frequencies, or non-standard system identification (SID) codes were used. The prior approach has been and continues to be unattractive since it requires the use of features that may not be present in all manufacturers' cellular subscribe units. In some systems, the regulatory requirements for allowing such special operation may be excessive to the point of impracticality.

Thus, there continues to be a need for private cellular-type systems which can provide limited access in the coverage area of a public cellular system. Preferably, the private system subscriber units would be the same as those of the public system.

In addition, it would be desirable to be able to provide public system service to a public system subscriber unit which happens to be within the coverage area of the private system. Conversely, it would also be desirable for a private system subscriber unit to be able to use the public cellular system.

SUMMARY OF THE INVENTION

An apparatus for providing service to a subscriber or movable transceiver unit from first, private, or second, public, radio telephone systems, where a coverage region of the first system is included, at least in part, in a coverage region of the second system includes receiver circuitry located in the first coverage region for receiving radio frequency signals from the second system. Control circuity is coupled to the receiving circuitry.

The control circuitry detects received signals from the second system. In response to the detected signals, the control circuitry retransmits a radio frequency command signal to a predetermined movable unit.

The command signal is transmitted into the first coverage region. The effect of the command signal is to direct that unit, if present in the first coverage region, to communicate with the second system.

In one aspect of the invention, the control circuity can include further circuitry for receiving radio frequency signals from a movable unit in the first coverage area which is requesting service from the second system. In response to the detected signals, the control circuitry can direct the subscriber unit so that it obtains the requested service from the second system and not the first system.

In yet another aspect of the invention, the control circuitry can include storage for a list of those units which are eligible for service from the first system. The control circuitry can also include storage for a list of control channel frequencies associated with the second system.

In yet another aspect of the invention, the control circuitry can include an interface which is coupled to a land line telephone system which is associated with the first system. In this instance, the control circuitry can further include storage for a list to convert a telephone number from the land line system to an identifier for a predetermined movable unit. The predetermined unit can then be serviced by the first system in response to a call being placed to the telephone number.

In yet another aspect of the invention, the control circuitry can include an amplifier and transmitter for transmitting radio frequency control signals at selected frequencies at a power level sufficient to saturate the first coverage area. As a result of saturating the first coverage area, movable units therein will respond to those radio frequency control signals from the control circuitry.

In yet another aspect of the invention, a private radio telephone system can be provided, which can operate simultaneously in a coverage area of a public radio telephone system. Subscriber units for the private system can be serviced when those units are within the coverage area of the private system.

When private system subscriber units move into the coverage area of the public system, they can then be serviced by the public radio telephone system. If a subscriber unit associated with the public radio telephone system moves into the coverage area of the private system, the private system can direct that unit to the public system for service.

These and other aspects and attributes of the present invention will become increasingly clear upon reference to the following drawings and accompanying specification.

DETAILED DESCRIPTION OF THE PREFERRED EMBODIMENT

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

Figure 1:
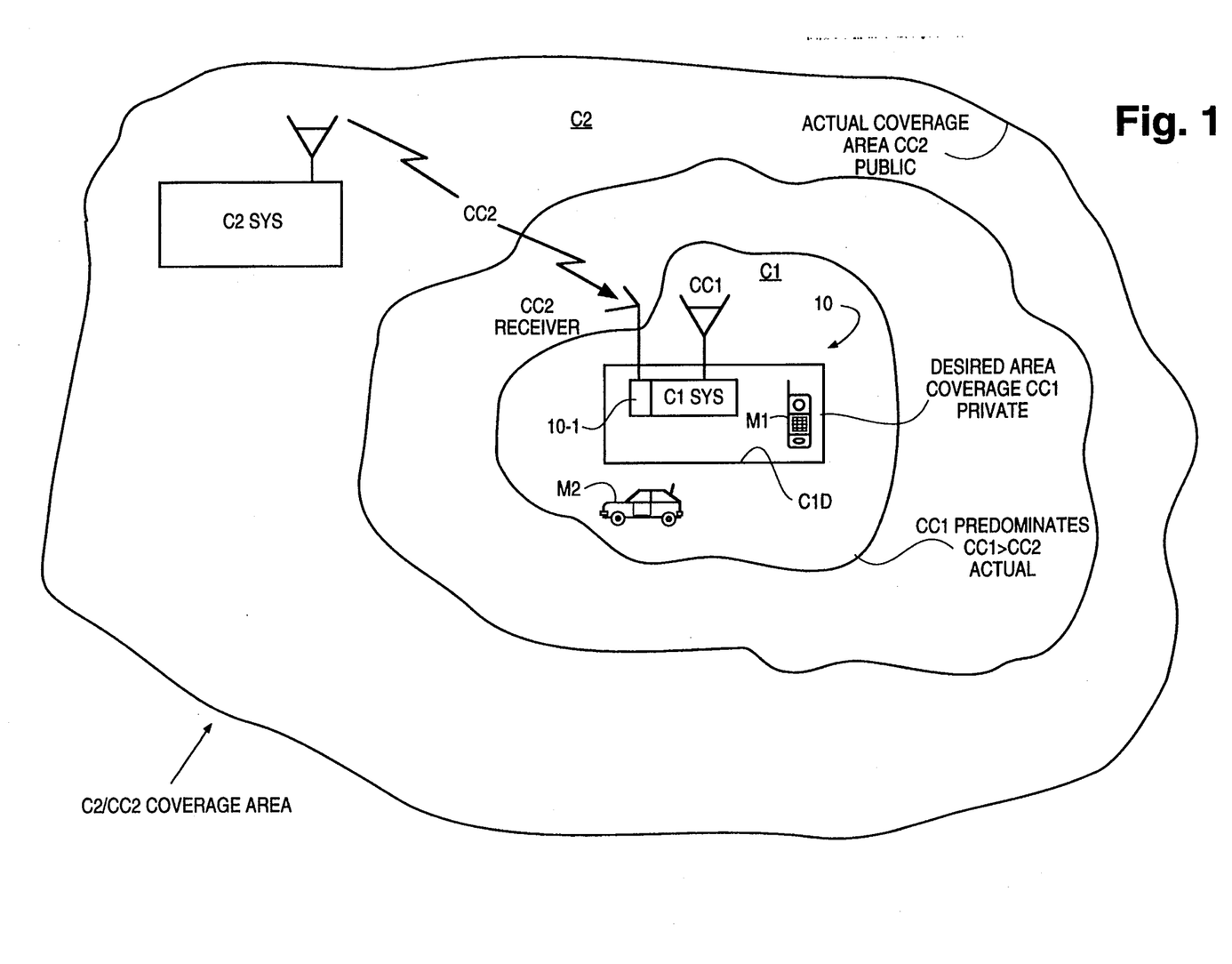
FIG. 1 is an overall diagram illustrating overlapping areas of coverage between a public radio telephone system and a private system in accordance with the present invention.

FIG. 1 illustrates, in an overall view, a system 10 in accordance with the present invention. The system 10 provides restricted or "private" cellular-type radio telephone service in a coverage area C1. The coverage area C1 exceeds that of a desired restricted service coverage area C1D, as described subsequently.

The coverage area C1 in FIG. 1 overlaps, at least in part, a coverage area C2 of a public access or public subscriber cellular-type radio telephone system C2S. It will be understood that the coverage area C1 need not overlap the coverage area C2.

Service on the limited access system 10 is provided to portable subscriber units M1, as well as to mobile units M2. The units M1, M2 can, in accordance with the present invention, be the same type of subscriber units as those that are intended to be serviced by the public C1S system. Hence, units M1, M2, when in the C1 coverage area, can request or receive service therefrom. When in the C2 coverage area, units M1, M2 can request and receive service therefrom.

The system 10 transmits a forward control signal CC1 on an allocated channel. The public system C2S transmits a control signal CC2 on a different allocated channel. Both CC1 and CC2 have associated reverse control channels for subscriber unit responses.

To ensure that all users within the desired coverage area, or C1D, are locked onto the private control channel CC1 of the limited access system 10, the actual served area C1, where the strength of the private control channel CC1 is greater than the strength of the public control channel CC2, is enlarged. This ensures that units in the C1D coverage area always tune to the CC1 control channel.

A receiver 10-1 for the public control channel CC2 is included in the private system 10. The data stream from public control channel CC2, as received at the receiver 10-1, is interpreted. All unit pages thereon are intercepted and repeated on the private control channel CC1.

If a unit responds to such a page on private control channel CC1, the private system control logic 10 will immediately respond with a "directed retry" command forcing the unit to repeat its page response on a different, but specified, reverse control channel, in this case, the public reverse control channel for CC2. When this occurs, the unit will become the responsibility of the public system C2S, which will set up and process the call normally.

If, while inside the C1 coverage area, a subscriber to the public cellular system C2S places a call, the private system 10 will determine that the sent Mobile Identification Number (MIN) is not part of its local user list. It will then send a directed retry message, again forcing the unit M1, M2 onto a specified control channel, again in this case public system control channel CC2. Once again, the subscriber's call will be processed by the public system C2S in the normal fashion.

This approach is not limited to single control channels, for either the private channel system or the public channel system. So long as the control channel frequencies are known, either by prior knowledge and planning, or by using scanning receivers, additional receivers can be added. A method can be included for selecting the best channel for the directed retry.

If a subscriber M1, M2 to the private cellular system 10 places a call while it is in the private control channel coverage area C1D, the private channel system 10 will determine that it is a local user, and processes the call by assigning a pair of voice channels and setting up the call. The assigned channels will not be in the public system C2S channel set.

In a like manner, if a call is placed to a subscriber mobile M1, M2 of the private system 10 on the private control channel CC1 in the private channel coverage area C1D, channels for the system 10 will be assigned and the call set up. Translation between the actual phone number dialed and the unit's MIN is possible. Thus, the subscriber unit M1, M2 of the private system can also be called on the public system C2S with a public phone number as part of a call forwarding system.

If however, subscriber unit M1, M2 of the private system 10 is called on the public system C2S, two choices are available. One choice is to retransmit the page (as received by the public receiver 10-1) on the private control channel C1 and then use a directed retry to force the subscriber unit of the private system onto the public control channel CC2 and proceed normally. Alternately, call forwarding on the public channel system C2S can be used to redirect the call into the private system 10. Either of these two methods may be used on a per unit basis dependent on prior selection or other determiner, such as time of day, etc.

Where there is no overlapping coverage, that is the private system 10 is operating in a region without any the public system C2S, any foreign units can either be directed to rescan with an audit message, for example, or merely intercepted, with a recorded no service message, when a call attempt is made.

The private system 10 can be used for in-plant or other specialized communications that should not normally be available to the public cellular user. Specifically, this invention allows increased coverage area for the private system 10, without depriving public users access to their normal cellular service. This provides a unique ability to provide specialized services to a subset of the total user base, without disrupting normal radio telephone service. Thus, a carrier will be able to offer incremental services and reap increased revenues and frequency utilization.

Figure 2:
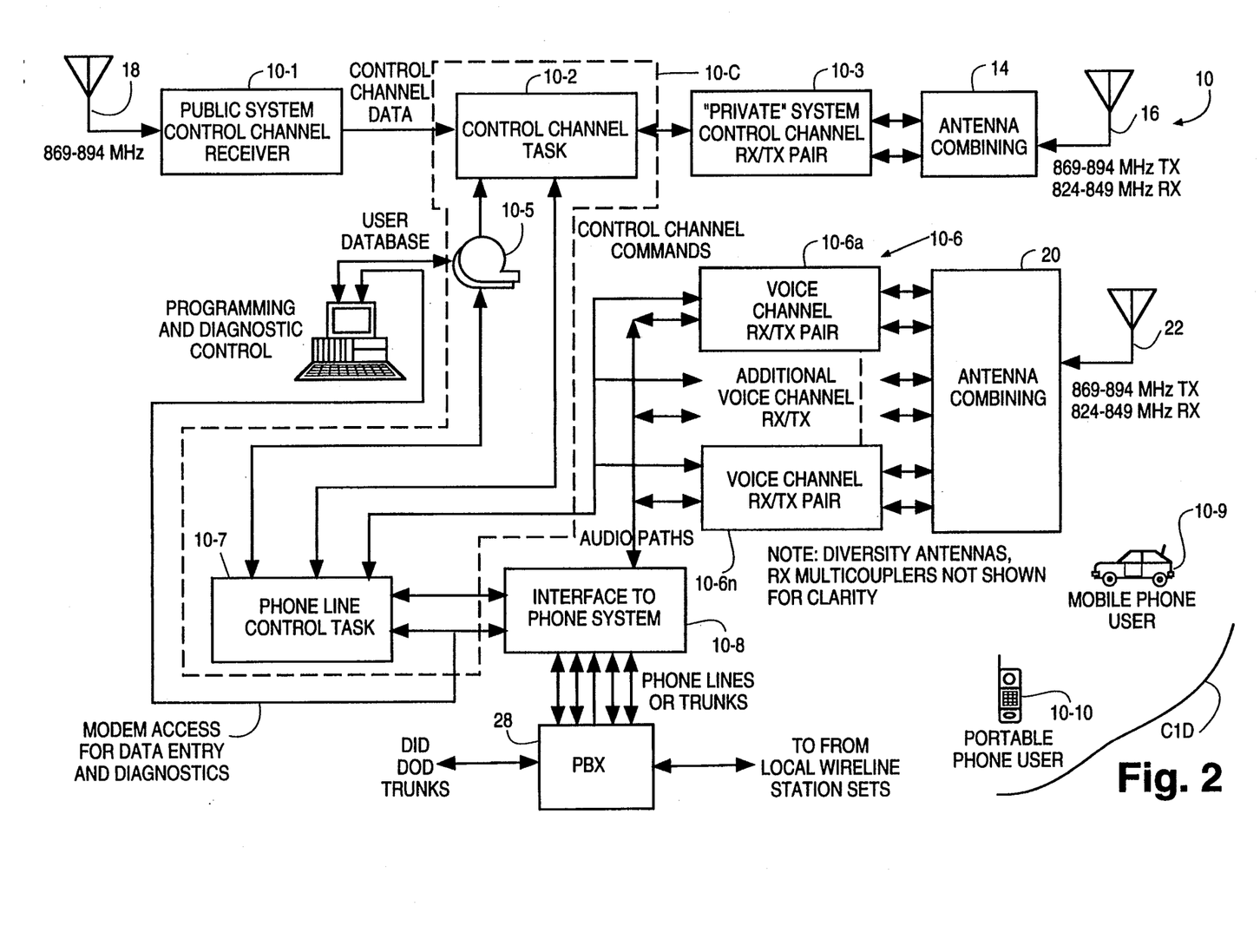
FIG. 2 is a block diagram of a private radio telephone system in accordance with the present invention.

FIG. 2 is a block diagram of the system 10. The system 10 includes the previously noted public system control channel receiver 10-1. In addition, the system 10 includes a control unit 10-C, illustrated in phantom, which can include a control computer, such as a microprocessor, relevant software, such as a control channel task 10-2, storage for a database 10-5, and a phone line control task 10-7.

The control unit 10-C is coupled to a receive/transmit pair 10-3. Such pairs, which define an interface between audio frequency and cellular-type radio frequency signals, are defined in EIA Standard IS-20a.

The transmitter/receiver channel pair 10-3 is in turn coupled to a combiner 14. Combiner 14 is in turn coupled to an antenna 16.

The antenna 16 transmits the predetermined control channel frequency CC1, and receives a predetermined reverse channel from the subscriber unit. An input antenna 18, for receipt of the control channel CC2 from the public system C2S, is also coupled to the receiver 10-1.

A plurality of transmitter/receiver pairs 10-6, of the same type as the pair 10-3, is provided for bidirectional communication of the voice channels associated with the system 10. The bidirectional channel pairs 10-6a thru 10-6n are assigned under the control of the control unit 10-C to provide forward and reverse voice channels between the system 10 and the related subscriber unit being serviced. Each receiver/transmitter pair provides a forward channel and a reverse channel to and from a subscriber unit.

Inputs and outputs of the plurality of channel pairs 10-6 are coupled to a combiner 20, which may be part of the aforementioned combiner 14. The combiner 20 is in turn coupled to an antenna 22 which transmits to and receives voice channel radio frequency signals from the subscriber units being serviced by the system 10.

Typical subscriber units which can be serviced by the system 10 include a vehicle mounted mobile phone 10-9, and a portable phone 10-10. Other types of subscriber units can also be used with the system 10.

An interface 10-8 provides bidirectional audio communication between the plurality of voice channel pairs 10-6 and the telephone system. The telephone system consists of a plurality of lines which may be, but are not limited to, DID/DOD trunks, individual subscriber lines, etc. These lines may originate from the public telephone system or from a local PBX or private telephone switch. Instead of connecting the interface 10-8 to a land line telephone system, it can be connected to a PBX 28. The PBX 28 is in turn coupled to a plurality of local wire line station sets. In addition, the PBX 28 is also coupled to a conventional, hard-wired, public, land line telephone system.

When the subscriber units, such as the mobile unit 10-9 or the portable unit 10-10, are within the desired area of coverage, C1D for example, those units can request and receive service via the system 10. This service is not available to subscriber units which are not associated with the system 10.

It is an important aspect of the system 10 that the units 10-9, 10-10 are compatible with the public system C2S. When the units 10-9 and 10-10 move into the coverage area C2 of the public system C2S, outside of the coverage area of the system 10, they can receive and/or request service from that system as well.

Figure 3:
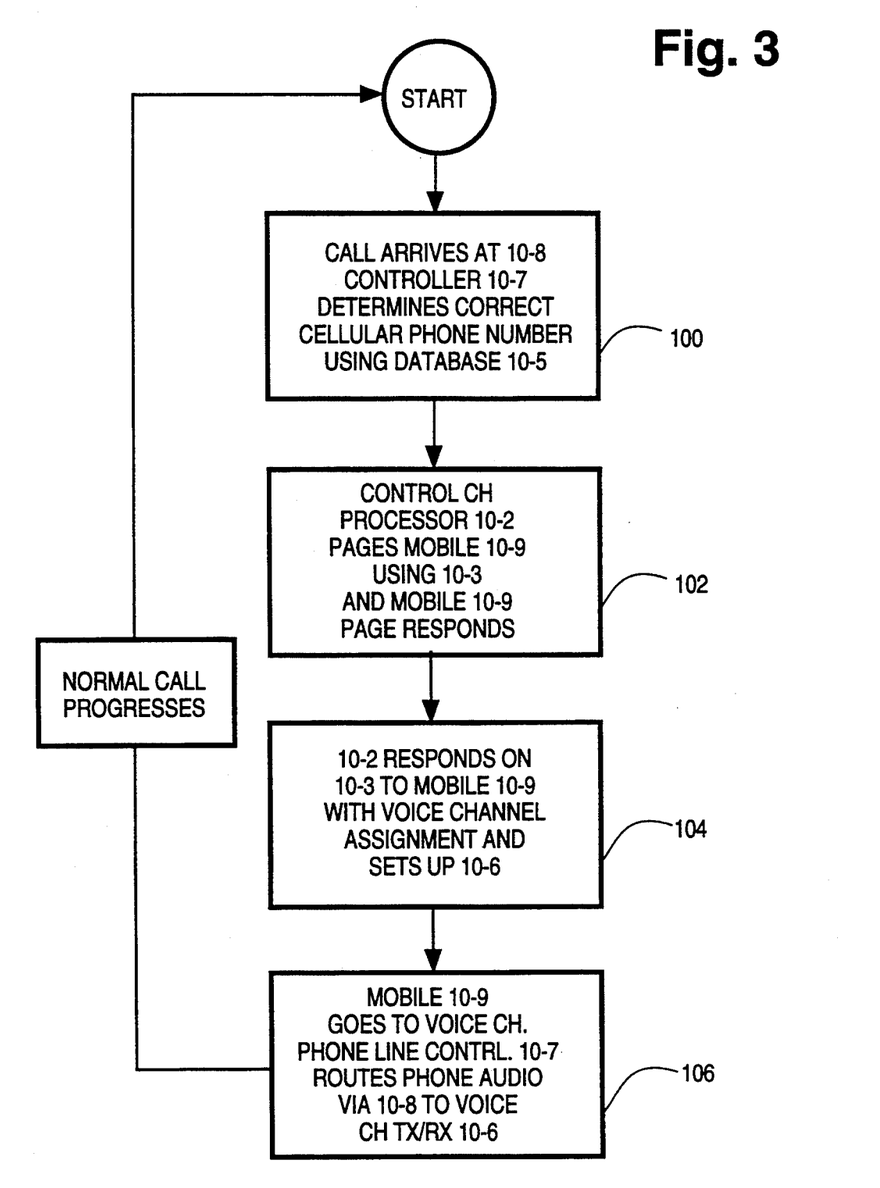
FIG. 3 is a flow diagram of a method of processing a call placed to a unit on the private system.

FIG. 3 is a block diagram of a method of processing carried out by the system 10 to provide service to subscriber units, such as 10-9 or 10-10, within the restricted coverage area C1D. For example, in a step 100, if an incoming call from local wire line stations set, local PBX, or the public land line system, arrives at the interface 10-8, the control unit 10-C, using the phone line control task software 10-7, is able to determine the correct cellular number to be associated with the respective subscriber unit. The user database 10-5 can include one or more translation tables, which can be used to translate a land line telephone number to a subscriber unit MIN for purposes of automatically switching incoming calls to the related subscriber unit.

In a step 102, the control unit 10-C, using the control channel task software 10-2 and the control channel transmitter branch of the transmitter/receiver pair 10-3, can issue a page to the subscriber unit 10-9 or 10-10 on control channel CC1. The subscriber unit, if present in the service area C1D, will respond on the reverse control channel associated with the system 10 and be detected by the receiver portion of the transmitter/receiver pair 10-3.

In a step 104, the control channel task software 10-2 then responds via the forward control channel transmitter of the pair 10-3 to direct the subscriber unit, such as the unit 10-9, to a voice channel pair, one of the plurality of pairs 10-6. Simultaneously, the control channel task software 10-2, in combination with the control unit 10-C and the phone line control task software 10-7, is able to set up the selected voice channel pair corresponding, for example, to voice channel pair 10-6a, for purposes of enabling the subscriber unit, such as 10-9, to communicate with the incoming call.

In a further step 106, the subscriber unit 10-9 or 10-10 switches to the assigned voice channel pair and the phone line control task software 10-7 routes the audio signal to and from the interface system 10-8 and the assigned voice channel pair 10-6a. The communication then takes place until the call is terminated by either the land line unit or by the subscriber unit 10-9 or 10-10.

Figure 4:
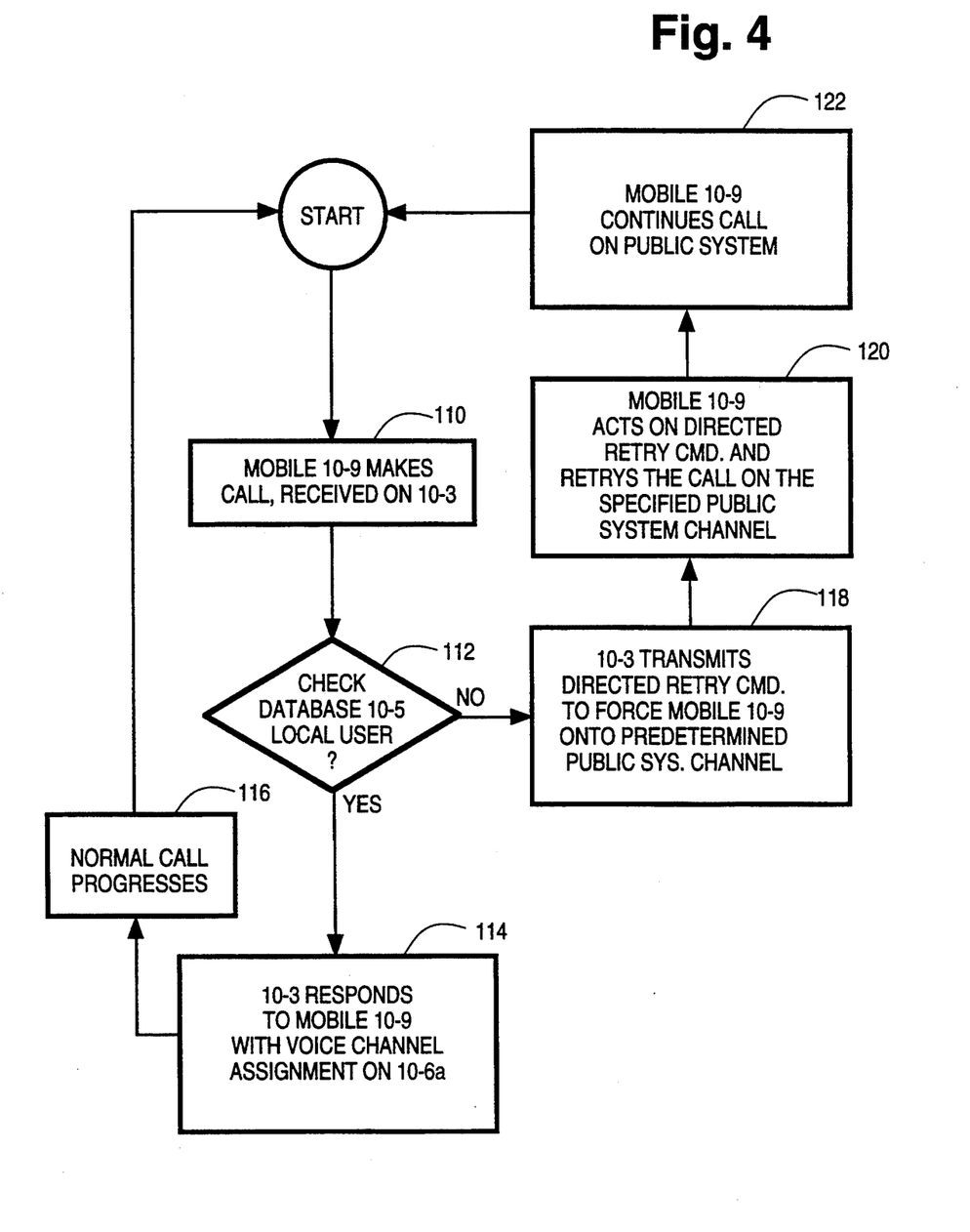
FIG. 4 is flow diagram of a method of processing a subscriber initiated call on the private system.

FIG. 4 is a block diagram illustrating a method of call processing wherein a subscriber unit, such as the unit 10-9 or 10-10, initiates a call utilizing the system 10. When a service or access request is received on the reverse control channel of the system 10 from a subscriber unit, such as the unit 10-9 or 10-10, it is in turn processed through the receive side of the transmitter/receiver pair 10-3 and the control channel task software 10-2 in a step 110. In a subsequent step 112, the control unit 10-C, in combination with the control channel task software 10-2, determines from the prestored user database 10-5 as to whether or not the subscriber unit 10-9 or 10-10 requesting service is a local or approved user.

Where the subscriber unit is a local unit, based on a preset list in the database 10-5, the control channel task software 10-2 transmits on the system 10 control channel, via the transmit side of the transmitter/receiver pair 10-3, a voice channel assignment corresponding to one of the pairs from the plurality 10-6. In addition, the control channel task and the control unit 10-C set up the selected voice channel pair, such as the pair 10-6a.

In a step 116, communication is established via the interface 10-8 with the called station set. Audio is switched to and from the voice channel pair, such as the pair 10-6a, and the telephone lines of the phone line interface to enable the subscriber unit, such as the unit 10-9, to communicate with either a local wire line station set or, if desired, a set on the public land line telephone system.

With respect to step 112, in the event that the subscriber unit seeking service is not found within the database 10-5, in a step 118 the control unit 10-C, via the forward control channel member of the pair 10-3 and the antenna 16, transmits a directed retry command to the subscriber unit, such as the unit 10-9, seeking service. The purpose of the directed retry command is to try to force that subscriber unit onto the control channel CC2 of the public system C2S.

In a step 120, the subscriber unit 10-9 or 10-10 then switches to the control channel CC2 for the public system C2S and retries the call on that system. In a step 122, the unit 10-9 would then continue the call on the public system C2S.

Figure 5:
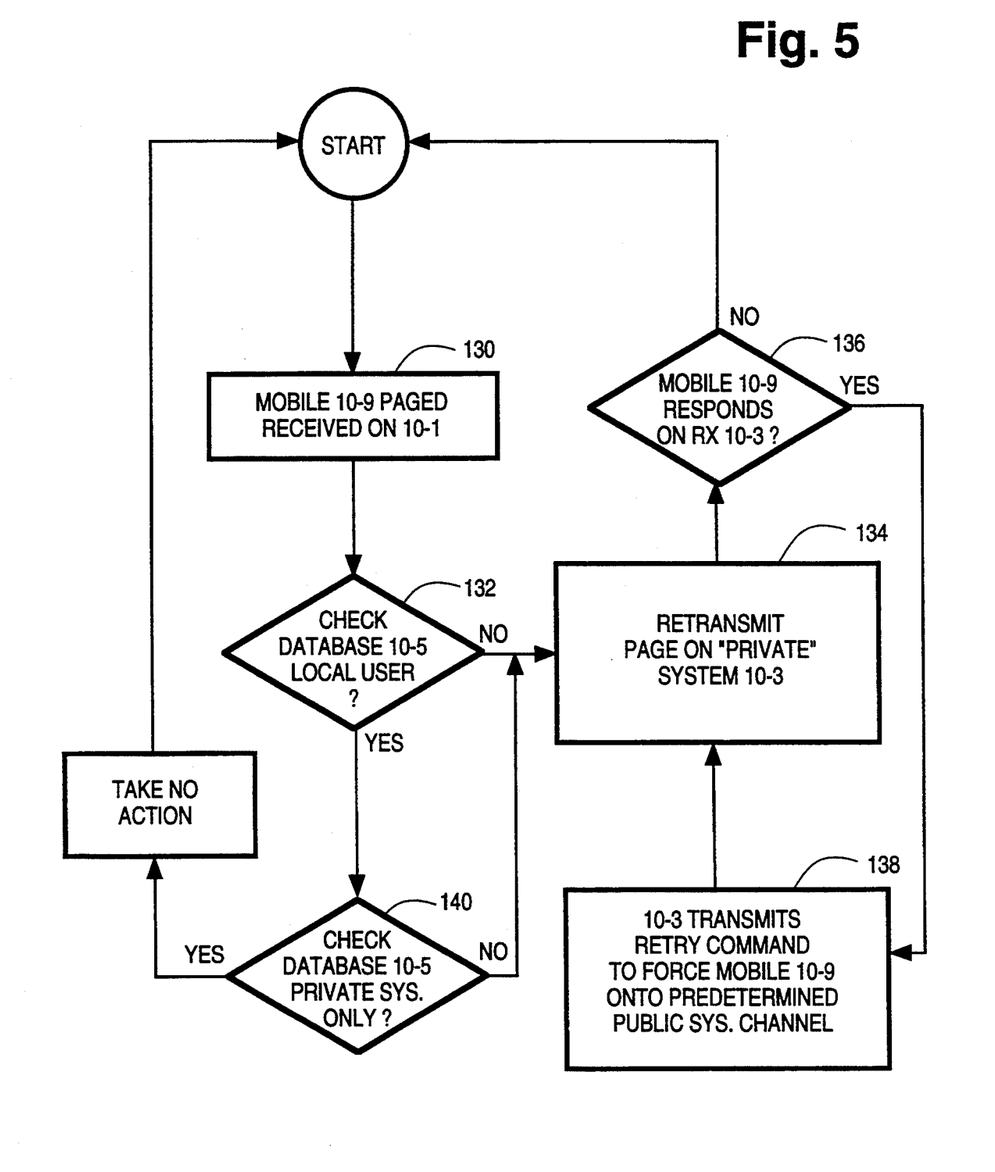
FIG. 5 is flow diagram of a method of processing a page from the public system received on the private system.

FIG. 5 is a flow diagram of a method wherein the system 10 can cause a subscriber unit, such as the unit 10-9 or 10-10, within the service area C1D to respond to a page from the public system C2S. In this instance, in a step 130 the unit 10-9 has been paged by the public system C2S on the control channel CC2. This page has been received at the public system control channel receiver 10-1.

The control unit 10-C then utilizes the database 10-5 in a step 132 to determine whether or not the subscriber unit being paged is a local user of the system 10. If not, in a step 134 the control unit 10-C, in combination with the control channel task software 10-2, will, via the control channel CC1 transmit branch of the pair 10-3, transmit a page message on the CC1 control channel.

In a step 136, the control unit 10-C determines if the addressed subscriber unit, such as the unit 10-9, has responded to the page on the reverse control channel CC1. If so, the control channel task software 10-2, in a step 138, will then transmit on the forward control channel, CC1, a retry command to force the unit 10-9 or 10-10 to switch to the predetermined public system C2S reverse control channel to respond to the page.

In the event that the subscriber unit 10-9 is not one of the local users identified in the database 10-5, in a step 140 a determination is made by the control channel task software 10-2, utilizing the database 10-5, whether or not service is available to the identified subscriber unit. If it is, the necessary page is transmitted in the step 134. If not, no action is taken to allow the call to remain unanswered and perhaps invoke a call forwarding feature.

Thus, as described above in accordance with the various methods, a local subscriber unit can initiate a call within the private system 10 or receive a call therefrom. Also, a unit that is not a local subscriber can receive a call, via the public system C2S, even when originally locked onto the private system 10. Finally, the private system subscriber units, such as the units 10-9 or 10-10, can be used directly in the coverage area C2 of the public system C2S.

It is a further advantage of the system 10 that additional services provided, such as provided by a PBX connected to the pone line interface, such as voice mail and call forwarding, can also be provided to the subscriber units for the system 10.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

We claim:

1. A private radio telephone system with a set of subscribers, having a first coverage area which overlaps at least in part, a second coverage area of a second, different radio telephone system with a different set of subscribers, wherein each of the systems can communicate with one or more associated movable, subscriber units located in a respective coverage region and wherein each of the systems has a respective set of control channels, each of which can be used to establish communication with a respective movable unit, the private system being associated with a telephone switch, the private system comprising:
   a controller with an input/output port for receiving communication signals thereto, and circuitry for transmitting radio frequency signals into the first coverage area; and
   a receiver coupled to said controller, for receiving the selected set of control channels for the second system and including further circuitry for retransmitting selected representations thereof on one of its respective control channels whereupon a movable subscriber unit in the first coverage area being called on the second system will initiate communication herewith.

2. A private system as in claim 1 including storage for maintaining a list of movable units eligible for service in the private system.

3. A private system as in claim 2 including circuitry for directing a movable unit not identified in said list to the second system for service.

4. A private system as in claim 1 including an amplifier for amplifying selected control channel signals to be transmitted into the first coverage area at a higher power level than corresponding control channel signals associated with the second system.

5. A private system as in claim 1 which includes a translation table wherein a communication signal associated with a first telephone number and received from the switch can be directed to a predetermined movable unit in the first coverage area.

6. A method of providing service to a movable unit by a first radio telephone system in a first coverage area simultaneously with providing service by a second different radio telephone system in a second coverage area wherein the first coverage area can overlap the second, the method comprising:
   transmitting into the first coverage area a control signal of a selected intensity from the second system;
   transmitting into the first coverage area a control signal from the first system at a higher intensity than that of the control signal from the second system, such that subscriber units in the first coverage area will initially respond to that control signal;
   detecting for use in the first coverage region the control signal from the second system, and retransmitting a processed representation of same as part of the control signal from the first system, thereby causing a selected subscriber unit which is to be serviced by the second system, and which is in the first coverage area to then respond to the control signal for the second system; and responding to a subscriber unit in the first coverage area, determining if it is to be serviced by the first system, and in response thereto providing service thereto.

7. An apparatus for providing service to movable subscriber units by first or second radio telephone systems, wherein the first and second system need not have the same subscribers and wherein a coverage region of the first system is included, at least in part, in a coverage region of the second system, and wherein the subscriber units are usable in either radio telephone system, the apparatus comprising:

circuitry, located in the first coverage region, for receiving radiant signals from the second system;

control circuitry, coupled to said receiving circuitry, for detecting received signals from the second system and in response thereto, for radiating a command signal to a predetermined subscriber unit in the first coverage region, thereby directing that unit, if present in the first coverage region, to communicate with the second system and wherein another subscriber unit is capable of communicating with the first system while in said first coverage region and is capable of communicating with the second system when outside of said first region.

8. An apparatus as in claim 7 wherein said control circuitry includes circuitry for storing a plurality of identifiers of subscriber units eligible to receive service from said first system.

* * * * *